(12) United States Patent
Viovy et al.

(10) Patent No.: US 9,840,636 B2
(45) Date of Patent: Dec. 12, 2017

(54) AMPHIPHILIC POLYMERS AND USE THEREOF IN THE TREATMENT OF SURFACES MADE OF HYDROPHOBIC MATERIALS

(71) Applicants: SOCIETE D'EXPLOITATION DE PRODUITS POUR LES INDUSTRIES CHIMIQUES SEPPIC, Paris (FR); CENTRE NATIONAL DE LA RECHERCHE SCIENTIFIQUE, Paris (FR); INSTITUT CURIE, Paris (FR); UNIVERSITE PIERRE ET MARIE CURIE (PARIS 6), Paris (FR)

(72) Inventors: Jean-Louis Viovy, Paris (FR); Olivier Braun, St Just St Rambert (FR)

(73) Assignees: SOCIETE D'EXPLOITATION DE PRODUITS POUR LES INDUSTRIES CHIMIQUES SEPPIC, Paris (FR); CENTRE NATIONAL DE LA RECHERCHE SCIENTIFIQUE, Paris (FR); INSTITUT CURIE, Paris (FR); UNIVERSITE PIERRE ET MARIE CURIE (PARIS 6), Paris (FR)

( * ) Notice: Subject to any disclaimer, the term of this patent is extended or adjusted under 35 U.S.C. 154(b) by 0 days.

(21) Appl. No.: 14/780,044

(22) PCT Filed: Mar. 21, 2014

(86) PCT No.: PCT/FR2014/050662
§ 371 (c)(1),
(2) Date: Sep. 25, 2015

(87) PCT Pub. No.: WO2014/154977
PCT Pub. Date: Oct. 2, 2014

(65) Prior Publication Data
US 2016/0040028 A1 Feb. 11, 2016

(30) Foreign Application Priority Data
Mar. 25, 2013 (FR) ..................... 13 52642

(51) Int. Cl.
*B05D 3/00* (2006.01)
*C09D 133/26* (2006.01)
*C08F 220/56* (2006.01)
*C08F 220/28* (2006.01)

(52) U.S. Cl.
CPC .......... *C09D 133/26* (2013.01); *B05D 3/002* (2013.01); *C08F 220/56* (2013.01); *C08F 2220/285* (2013.01)

(58) Field of Classification Search
None
See application file for complete search history.

(56) References Cited

U.S. PATENT DOCUMENTS

| | | |
|---|---|---|
| 2004/0101970 A1 | 5/2004 | Viovy et al. |
| 2012/0172457 A1 | 7/2012 | Braun et al. |
| 2014/0213496 A1 | 7/2014 | Merat |

FOREIGN PATENT DOCUMENTS

| | | |
|---|---|---|
| FR | 2 810 905 A1 | 1/2002 |
| WO | 2011/030044 A1 | 3/2011 |
| WO | 2011/113470 A1 | 9/2011 |
| WO | 2013/030499 A2 | 3/2013 |

OTHER PUBLICATIONS

International Search Report, dated May 16, 2014, from corresponding PCT application.

*Primary Examiner* — Ana L Woodward
(74) *Attorney, Agent, or Firm* — Young & Thompson

(57) ABSTRACT

A straight, branched or cross-linked polymer, including, per 100 mol %: a) a mole fraction from 75% to 99.95% of monomer units from an N,N-dialkyl acrylamide; b) a mole fraction from 0.05% to 1% of monomer units from a monomer of formula (I): $CH_2=C(R_i)-C(=O)-O-[(CH_2-CH(R_2)-O]_n-R_3$ (I); c) optionally a mole fraction higher than 0% to 24% either of monomer units from a monomer including a free strong acid function, partially or totally salified, or of monomer units from a monomer of formula (II): $CH_2=C(R_4)-C(=O)-Y-(CH_2)_m-N(R_5)(R_6)$ (II); d) optionally a mole fraction higher than 0% to 1% of a diethylene or polyethylene cross-linking monomer. Also, a method for treating a surface made of a hydrophobic material, using the polymer, and an aqueous, hydro-organic or organic solution including the polymer for modifying interactions between the species contained the solution and the hydrophobic surface.

2 Claims, 1 Drawing Sheet

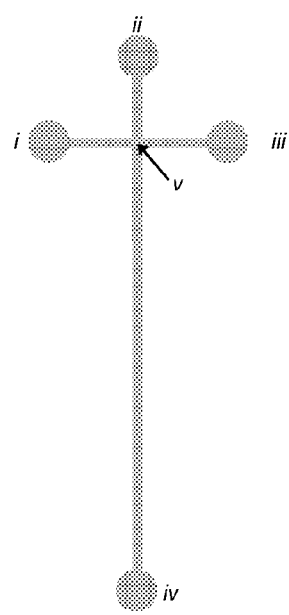
Figure 1
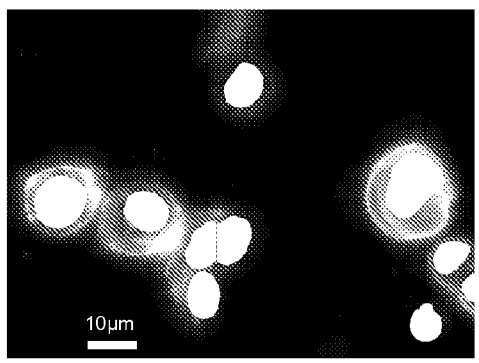 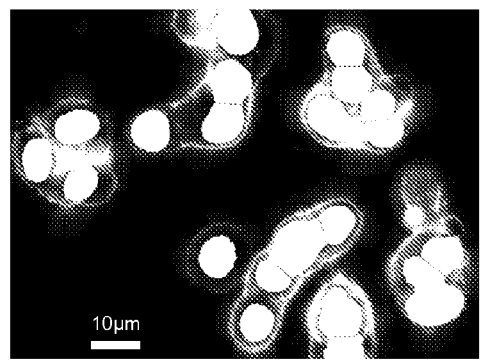
Figure 2a                    Figure 2b

AMPHIPHILIC POLYMERS AND USE THEREOF IN THE TREATMENT OF SURFACES MADE OF HYDROPHOBIC MATERIALS

FIELD OF THE INVENTION

The invention relates to novel polymers, to the process for their preparation and to their application in the treatment of surfaces, in particular surfaces made of hydrophobic plastic.

BACKGROUND OF THE INVENTION

Developments are currently being undertaken to develop applications, such as medical tests, chemical or biological analyses or synthesis operations, in microfluidic systems also denoted labs-on-chips.

These labs-on-chips are composed of a hydrophobic plastic, such as COC (cyclic olefin copolymer), COP (cyclic olefin polymer) and more generally poly(cycloolefins), PMMA (polymethyl methacrylate) and more generally acrylic polymers, polycarbonate, polyesters, silicones, certain polyurethanes and more generally any kind of resin, polymerizable under cold conditions or under hot conditions, of thermoformable materials.

The materials of COC type, for example, are not very dense, are very transparent, are biocompatible, have a thermal resistance up to 170° C. and have good resistance to chemicals.

However, their hydrophobic nature results in some disadvantages, such as interactions with some biological molecules, such as proteins, organic molecules, such as colorants, labels, drugs or any other type of molecule which it might be desired to study or prepare in such labs-on-chips, but also with micro- or nanoparticles which are often used as interaction support in these labs-on-chips. In order to overcome this disadvantage, the surface of the material is treated with an appropriate polymer which can, as the case may be, be neutral or be cationic, anionic or ampholytic in nature.

The French patent application published under the number 2 810 905 discloses an amphiphilic comb copolymer composed of a main backbone of poly(N,N-dimethyl-acrylamide) and of poly(methyl methacrylate) grafts. These hydrophobic units are adsorbed on the material of COC type and the poly(N,N-dimethylacrylamide) backbone gives a hydrophilic nature to the surface of the material.

In point of fact, the industrial synthesis of such a copolymer is difficult as it involves the preparation of a methyl methacrylate macromer and the copolymerization in solvent phases with purification stages.

Furthermore, as from the viewpoint of the development of the technique of the labs-on-chips for immobilizing cells, it may be necessary to render the hydrophobic surface slightly cationic.

SUMMARY OF THE INVENTION

The inventors have thus endeavored to develop novel polymers which make it possible to solve the problems touched on above and also a process which makes it possible to treat and control the surface of polymers, of microchannels or of rnicrofluidic devices.

According to a first aspect, a subject matter of the invention is a linear, branched or crosslinked polymer comprising, per 100 mol %:

a) a molar proportion of greater than or equal to 75% and less than or equal to 99.95% of monomer units resulting from an N,N-dialkylacrylamide, the alkyl radicals each comprising from 1 to 4 carbon atoms;

b) a molar proportion of greater than or equal to 0.05% and less than or equal to 1% of monomer units resulting from a monomer of formula (I):

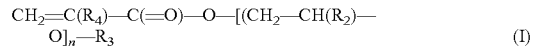

in which n represents a number between 1 and 50, $R_1$ represents a hydrogen atom or a methyl radical, $R_2$ represents a hydrogen atom, a methyl radical or an ethyl radical and $R_3$ represents a saturated or unsaturated and linear or branched aliphatic hydrocarbon radical comprising from 8 to 30 carbon atoms, and c) optionally a molar proportion of greater than 0% and less than or equal to 24% either of monomer units resulting from a monomer comprising a free, partially salified or completely salified strong acid functional group or of monomer units resulting from a monomer of formula (II):

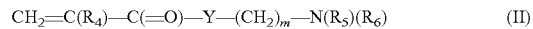

in which m represents a number between 1 and 4, Y represents O or NH, $R_4$ represents a hydrogen atom or a methyl radical and $R_5$ and $R_6$, which are identical or different, represent a methyl radical or an ethyl radical, and d) optionally a molar proportion of greater than 0% and less than or equal to 1% of a diethylenic or polyethylenic crosslinking monomer.

Branched polymer denotes a nonlinear polymer which has pendant chains, so as to obtain, when they are dissolved in water, a high state of entanglement resulting in very high viscosities at a low rate gradient.

Crosslinked polymer denotes a nonlinear polymer which is provided in the state of a three-dimensional network which is insoluble in water but swellable in water and which thus results in a chemical gel being obtained.

The polymer obtained by the process according to the invention can comprise crosslinked units and/or branched units.

According to a specific aspect, a subject matter of the invention is the polymer as defined above, in which the monomer units resulting from N,N-dialkylacrylamide result from N,N-dimethylacrylamide (denoted DMAM hereinafter) or N,N-diethylacrylamide (denoted DEAM hereinafter).

In the context of the present invention, the monomer of formula (I) appropriate to the preparation of the polymer which is a subject matter of the present invention is surface-active. It has to have a chain which is sufficiently hydrophobic to be able to be adsorbed on a hydrophobic support and a part which is sufficiently hydrophilic capable of interacting with the biological molecules in an attractive or repulsive way, as required.

In the formula (I) as defined above, the divalent radical:

represents in particular:

either a chain composed solely of ethoxyl groups ($R_2$=H; m>0), or a chain composed solely of propoxyl groups ($R_2$=$CH_3$; m>0), or a chain composed solely of butoxyl groups ($R_2$=$O_2H_5$; m>0), or a chain composed of at least two different groups chosen from ethoxyl, propoxyl and/or butoxyl groups.

When this chain is composed of different groups, they are distributed all along this chain, sequentially or randomly.

Saturated or unsaturated and linear aliphatic hydrocarbon radical comprising from 8 to 30 carbon atoms denotes more particularly for $R_3$, in the formula (I) as defined above:
either a radical derived from linear primary alcohols, such as, for example, those derived from octyl, pelargonic, decyl, undecyl, undecenyl, lauryl, tridecyl, myristyl, pentadecyl, cetyl, heptadecyl, stearyl, oleyl, linoleyl, nonadecyl, arachidyl, behenyl or erucyl alcohol or 1-triacontanol. They are then the octyl, nonyl, decyl, undecyl, 10-undecenyl, dodecyl, tridecyl, tetradecyl, pentadecyl, hexadecyl, heptadecyl, octadecyl, 9-octadecenyl, 10,12-octadecadienyl, nonadecyl, eicosyl, docosyl, 13-docosenyl or triacontyle radical;
or a radical derived from Guerbet alcohols, which are branched 1-alkanols corresponding to the general formula:

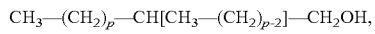

in which p represents an integer of between 2 and 14, such as, for example, the 2-ethyl-hexyl, 2-propylheptyl, 2-butyloctyl, 2-pentylnonyl, 2-hexyldecyl or 2-octyldodecyl radical;
or a radical derived from the isoalkanols corresponding to the general formula:

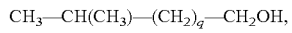

in which q represents an integer of between 2 and 26, such as, for example, the 4-methyl-pentyl, 5-methylhexyl, 6-methylheptyl, 15-methylpentadecyl or 16-methylheptadecyl radical;
or the 2-hexyloctyl, 2-octyldecyl or 2-hexyldodecyl radical.

Saturated or unsaturated and linear or branched aliphatic hydrocarbon radical comprising from 8 to 30 carbon atoms more particularly denotes for $R_3$, in the formula (I) as defined above, an alkyl radical comprising from 12 to 22 carbon atoms.

In the formula (I) as defined above, n more particularly represents a number of between 4 and 25.

A subject matter of the invention is very particularly the polymer as defined above in which the monomer units resulting from the monomer of formula (I) result from:
pentacosaethoxylated behenyl methacrylate, the compound of formula (I) as defined above in which $R_1$ represents the methyl radical, $R_2$ represents a hydrogen atom, $R_3$ represents the docosyl radical and n is equal to 25 [denoted BEM-25(EO) hereinafter]; or:
eicosaethoxylated stearyl methacrylate, the compound of formula (I) as defined above in which $R_1$ represents the methyl radical, $R_2$ represents a hydrogen atom, $R_3$ represents the stearyl radical and n is equal to 20 [denoted SMA-20(EO) hereinafter].

Monomer comprising a strong acid functional group denotes, in the context of the present invention, in particular an acyclic monomer comprising a sulfonic functional group or a phosphonic functional group and at least one unsaturated carbon-carbon bond.

When the strong acid functional group is partially or completely salified, it is more particularly the sodium salt, the potassium salt or the ammonium salt which is concerned.

According to another specific aspect of the present invention, the polymer as defined above is characterized in that, when it comprises monomer units resulting from the monomer comprising a free, partially salified or completely salified strong acid functional group, these result from free, partially salified or completely salified 2-methyl-2-[(1-oxo-2-propenyl)amino]-1-propanesulfonic acid (denoted ATBS hereinafter).

According to two specific aspects of the present invention, said linear, branched or crosslinked polymer as defined above is characterized in that, when it comprises monomer units resulting from the monomer of formula (II), m is equal to 2 or to 3 in said formula (II) and/or $R_5$ and $R_6$ each represent a methyl radical.

According to these specific aspects, the polymer as defined above is characterized in that, when it comprises monomer units resulting from the monomer of formula (II), these result from:
dimethylaminoethyl methacrylate (denoted DMAEMA hereinafter), or
N-[3-(dimethylamino)propyl]acrylamide (denoted DMAPAA hereinafter).

According to another specific form of the present invention, a subject matter of the latter is the polymer as defined above comprising, per 100 mol %:
a) a molar proportion of greater than or equal to 99% and less than or equal to 99.9% of monomer units resulting from N,N-dialkylacrylamide; and
b) a molar proportion of greater than or equal to 0.1% and less than or equal to 1% of the monomer of formula (I'):

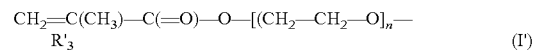

in which n' represents a number of between 4 and 25 and $R_3$ represents a saturated or unsaturated and linear or branched alkyl comprising from 12 to 22 carbon atoms, Another subject matter of the invention is more particularly the polymer as defined above comprising, per 100 mol %:
a) a molar proportion of greater than or equal to 80% and less than or equal to 95% of monomer units resulting from N,N-dialkylacrylamide, the alkyl radicals each comprising from 1 to 4 carbon atoms;
b) a molar proportion of greater than or equal to 0.1% and less than or equal to 0.5% of monomer units from the monomer of formula (I'):

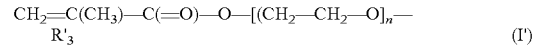

in which n' represents a number of between 4 and 25 and $R_3$ represents a saturated or unsaturated and linear or branched alkyl comprising from 12 to 22 carbon atoms, and
c) a molar proportion of greater than or equal to 4% and less than or equal to 19% of monomer units resulting from free, partially salified or completely salified 2-methyl-2-[(1-oxo-2-propenyl)amino]-1-propanesulfonic acid;

and the polymer as defined above comprising, per 100 mol %:
a) a molar proportion of greater than or equal to 80% and less than or equal to 95% of monomer units resulting from N,N-dialkylacrylamide, the alkyl radicals each comprising from 1 to 4 carbon atoms;
b) a molar proportion of greater than or equal to 0.1% and less than or equal to 0.5% of monomer units from the monomer of formula (I'):

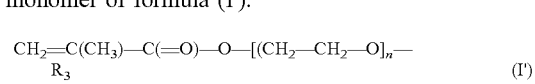

in which n' represents a number of between 4 and 25 and $R'_3$ represents a saturated or unsaturated and linear or branched alkyl comprising from 12 to 22 carbon atoms, and c) molar proportion of greater than or equal to 4% and less than or equal to 19% of monomer units resulting from dimethylaminoethyl methacrylate or N-[3-(dimethylamino)propyl]acrylamide.

A subject matter of the invention is very particularly the following polymers:
the DMAM/BEM-25(EO) copolymer,
the DMAWATBS (sodium salt)/BEM-25(EO) copolymer and
the DMAM/DMAPANBEM-25(EO) copolymer.

Another subject matter of the invention is a process for the preparation of the polymer as defined above, characterized in that:
all of the monomers are introduced, with stirring, into water or into a water/alcohol mixture, the alcohol being more particularly chosen from methanol, ethanol or isopropanol;
the mixture is deoxygenated by sparging with nitrogen;
a water-soluble radical polymerization initiator, such as 2,2'-azobis(2-amidino-propane) dihydrochloride (also denoted V50), is subsequently introduced therein and then polymerization is allowed to take place until the monomers have been completely consumed, the temperature being maintained in the vicinity of 50° C.

According to another aspect, a subject matter of the invention is a process for the treatment of a surface composed, in all or in part, of a hydrophobic material, commonly known as "static pretreatment", characterized in that it comprises:
a stage a) during which an aqueous, aqueous/organic or organic solution of the polymer as defined above is brought into contact with said surface and is allowed to incubate;
a stage b) of rinsing said surface resulting from stage a), in order to remove said polymer not adsorbed on the surface from said surface;
optionally, a stage c) of drying said rinsed surface resulting from stage b).

Preferably, the hydrophobic material employed in the process as defined above is a polymer material, such as COC, COP and more generally poly(cycloolefins), PMMA and more generally acrylic polymers, polycarbonate, polyesters, silicones, certain polyurethanes and more generally any type of resin, polymerizable under cold conditions or under hot conditions, of thermoformable materials.

Preferably, the surface to be treated by the process as defined above is a surface of a chip, of a microfluidic system, of a microsystem or of a lab-on-a-chip.

Organic solution of the polymer denotes, in stage a) of the process as defined above, a solution of said polymer in an organic solvent.

Aqueous/organic solution denotes, in stage a) of the process as defined above, a solution of said polymer in a miscible mixture of water and of a water-miscible organic compound. Such aqueous/organic mixtures are known to a person skilled in the art, in particular as mobile phase for chromatography.

According to some preferred embodiments of the process as defined above, said organic compound, used pure or as a mixture with water to dissolve the polymer according to the invention, can be an alcohol, an ester, a ketone, a carboxylic acid, dimethyl sulfoxide (DMSO), dimethylformamide (DMF) or any other organic solvent known to a person skilled in the art.

According to another preferred form of the process as defined above, said organic compound is a nonsolvent for the material constituting the surface to be treated.

According to some preferred embodiments of the process as defined above, said organic compound is a polar compound.

According to a particularly preferred embodiment of the process as defined above, said organic compound is ethanol.

In the process as defined above, chip denotes in particular a plate from approximately 5 $cm^2$ to 50 $cm^2$, with a thickness from approximately 0.1 cm to 1 cm.

In the process as defined above, microfluidic system denotes a system comprising at least one closed or opened microcavity comprising, in at least one direction, a dimension of less than one millimeter.

According to the destination which is assigned to it, said chip or said system can be subjected, prior to stage a) of the treatment process as defined above, to a stage d) of molding or etching, so as to create, on said surface composed, in all or in part, of a hydrophobic material, channels exhibiting, in one direction, at least one dimension of less than 1 mm.

A subject matter of said process as defined above is in particular the modification of the wettability of said surface, in particular its contact angle with water, and/or the modification its electroosmosis properties, and/or the modification of its properties of adsorption with respect to entities (molecular or particulate).

The process as defined above is particularly advantageous in modifying the adhesion properties of hydrophobic surfaces with respect to entities such as organic molecules, biological molecules, such as nucleic acids, proteins, peptides, metabolites, pharmaceutical active principles, glycol peptides, polysaccharides or also objects of micrometric or nanometric size, such as cells, viruses, particles, colloids or micelles.

The invention can advantageously be employed in numerous applications to reduce the adhesion of said entities. However, the invention can also be advantageous in facilitating adhesion of certain entities, for example by inducing, on hydrophobic surfaces, the fixing of entities of opposite charges by the use of a cationic polymer, in order to promote the adhesion of cells to hydrophobic surfaces to which they would not spontaneously adhere, or on the contrary by the use of an anionic polymer, in order to promote the adsorption of cationic polymers, such as polylysine or fibronectin, which in their turn can promote the adhesion of certain cells, or also modify electroosmosis properties, This is why another subject matter of the invention is the use of the polymer as defined above as agent for modifying the interactions between the entities present in an aqueous, aqueous/organic or organic solution and a surface composed, in all or in part, of a hydrophobic material.

Entities present in said aqueous solution denotes in particular not only organic molecules or biological molecules, such as nucleic acids, proteins, peptides, metabolites, pharmaceutical active principles, glycopeptides or polysaccharides, but also objects of micrometric or nanometric size, such as cells, viruses, particles, colloids or micelles.

This embodiment according to the use as defined above corresponds in particular to the principle of surface treatment known as "dynamic coating", during which treatment the polymer is in permanent equilibrium between a portion adsorbed on the surface and a portion present in the solution, which allows it to be replaced on said surface. This favored embodiment makes it possible, in some cases, to increase the longevity of the surface treatment. During a dynamic coating, the concentration of polymer used is preferably lower than that used for a static pretreatment, preferably of between $10^{-6}$% and 0.1% by weight, preferably between $10^{-4}$% and 0.01% by weight.

According to some embodiments, said dynamic coating can be combined with a static pretreatment in order to combine the advantages of the two forms.

According to another preferred embodiment, the concentration of polymer in a solution used in static pretreatment or in dynamic coating is determined from its critical micelle concentration (or CMC).

The methods for the determination of the CMC are known to a person skilled in the art and are described in the literature. Thus, for a static pretreatment, in a favored embodiment, the polymer is used at a concentration of between 0.1×CMC and 100×CMC and more preferably between 1×CMC and 50×CMC in the solution used for the surface treatment. For a dynamic coating, the concentration of polymer used will preferably be between $10^3$×CMC and 10×CMC, preferably between $10^{-2}$×CMC and the CMC.

Another subject matter of the invention is an aqueous, organic or aqueous/organic solution comprising a linear, branched or crosslinked polymer as defined above at a concentration by weight of between $10^{-4}$% and 10%.

According to a specific form, said aqueous, organic or aqueous/organic solution as defined above is an aqueous solution in which the concentration of said linear, branched or crosslinked polymer is between $10^{-4}$% and 1% by weight, preferably between $10^{-3}$% and 0.1% by weight.

According to another specific form, said aqueous, organic or aqueous/organic solution as defined above is an ethanolic solution in which the concentration of said linear, branched or crosslinked polymer is between $10^{-4}$% and 10% by weight, preferably between $10^{-2}$% and 1% by weight.

Finally, a subject matter of the invention is a kit comprising:

a) at least one container, containing the linear, branched or crosslinked polymer as defined above, and b) at least one container, containing the liquid base able and intended to prepare said aqueous, organic or aqueous/organic solution comprising said linear, branched or crosslinked polymer.

Said aqueous, organic or aqueous/organic solution comprising said linear, branched or crosslinked polymer thus prepared by means of this kit is subsequently employed in the treatment process as defined above, in particular in order to render the treated surface more hydrophilic, or to modify its adsorption properties with respect to entities, or to modify their electroosmosis properties.

BRIEF DESCRIPTION OF THE DRAWINGS

FIG. 1 illustrate a design of microchannels forming a cross v with branches i, ii, iii, and iv, FIG. 2a illustrates MCF-7 cells cultured on COC slides treated with a HEC+PLL solution. The membranes of the cells, visible by EpCAM labeling, are not well defined or are not observable.

FIG. 2b illustrates MCF-7 cells subjected to the cationic DMAM-C22 treatment (without PLL). A suitable cell density and doublets or multiplets of cells. which are characteristics of divided cells, are observed.

DETAILED DESCRIPTION OF THE INVENTION

The following examples illustrate the invention without, however, limiting it.

Example 1: Preparation of a DMAM/BEM-25(EO) Copolymer (Polymer 1)

The polymer 1 is prepared as follows:
The monomers are mixed in water in the amounts shown in the following table:

| Material | Stoichiometry | Charge |
| --- | --- | --- |
| DMAM | 95% by weight (~99.65 mol %) | 95 g |
| BEM-25(EO) | 5% by weight (~0.35 mol %) | 5 g |
| Water | | 900 g |
| V50 | 0.1 mol %/monomers | 0.26 g |

After deoxygenating for 45 minutes, the reaction medium is brought to 50° C. and the V50 is introduced into the reactor. The reaction medium slightly whitens and becomes viscous. An increase in the temperature of approximately 3.6° C. is recorded. The reaction is halted after 2 hours. After filtration, washing and drying, polymer 1 is obtained. Polymer 1 is characterized as follows:

Visual appearance: cloudy viscous liquid;

Viscosity of a 3% by weight dispersion of polymer 1 in water at 25° C. (Brookfield™ RVT, spindle 3, speed: 5 revolutions per minute): 440 mPa·s;

Viscosity of a 3% by weight dispersion of polymer 1 in water at 25° C. (CAP2000™, cone 1, speed: 50 revolutions per minute): 196 mPa·s;

Residual content of N,N-dimethylacrylamide: less than 0.05% by weight;

Weight of polymer obtained: 100 g.

Examples 2 and 3: Preparation of Polymers 2 and 3

Other tests were carried out under the same operating conditions as in example 1, the contents by weight of the various compounds employed being modified, as shown in the following table, in order to result in polymers 2 and 3.

| Material | Polymer 2 | Polymer 3 |
| --- | --- | --- |
| DMAM/BEM-25(EO) ratio by weight | 97.5/2.5 | 90/10 |
| Molar content of BEM-25(EO) | 0.175% | 0.7% |
| DMAM | 97.5 g | 90 g |
| BEM-25(EO) | 2.5 g | 10 g |
| Water | 900 g | 900 g |
| V50 | 0.26 g | 0.26 g |

The operating conditions are identical to those of the preceding example 1. Polymers 2 and 3 are characterized as follows:

Polymer 2

Visual appearance: cloudy viscous liquid;

Viscosity of a 3% by weight dispersion of polymer 2 in water at 25° C. (Brookield™ RVT, spindle 3, speed: 5 revolutions per minute): 2240 mPa·s;

Residual content of N,N-dimethylacrylamide: less than 0.05% by weight;

Weight of polymer obtained: 100 g.

Polymer 3

Visual appearance: white, very viscous liquid;

Viscosity of a 3% by weight dispersion of polymer 3 in water at 25° C. (Brookfield™ RVT, spindle 3, speed: 5 revolutions per minute): 3800 mPa·s;

Residual content of N,N-dimethylacrylamide: less than 0.05% by weight;

Weight of polymer obtained: 100 g.

Example 4: Preparation of a DMAM/ATBSNa/BEM-25(EO) Anionic Polymer (Polymer 4)

Polymer 4 is prepared as follows:
The monomers are mixed in water in the amounts shown in the following table:

| Material | Polymer 4 |
|---|---|
| DMAM/ATBS, Na salt/BEM-25(EO) ratio by weight | 75/20/5 |
| DMAM/ATBS, Na salt/BEM-25(EO) molar ratio | 90/10/0.35 |
| DMAM | 75.25 g |
| ATBS, Na salt, 55% | 35.4 g |
| BEM-25(EO) | 5 g |
| Water | q.s. for 1000 g |
| V50 (0.1 mol %/monomers) | 0.23 g |

After deoxygenating for 45 minutes, the reaction medium is brought to 50° C. and the V50 is introduced into the reactor. The reaction medium rapidly whitens after the introduction of the initiator and becomes viscous. Stirring is reduced. After reacting for 2 hours, heating is halted and the product is left for 2 hours before emptying. The DMAM content is <0.05% (552-385B method), which means that the polymerization reaction has indeed taken place.

Example 5: Preparation of a DMAM/DMAPANBEM-25(EO) Cationic Polymer (Polymer 5)

| Material | Polymer 5 |
|---|---|
| DMAM/DMAPAA/BEM-25(EO) ratio by weight | 80/15/5 |
| DMAM/DMAPAA/BEM-25(EO) molar ratio | 90/10/0.35 |
| DMAM | 80.2 g |
| DMAPAA | 14.3 g |
| BEM-25(EO) | 5 g |
| 1N HCl | q.s. for pH = 7 |
| Water | q.s. for 1000 g |
| V50 (0.1 mol %/monomers) | 0.24 g |

The procedure used is that described above. The reaction medium is maintained at pH=7; it rapidly whitens and becomes viscous. After reacting for 1 h 30, heating is halted and the reaction medium is left to cool overnight. The DMAM content is <0.05%, which means that the polymerization reaction has indeed taken place.

Example 6: Treatment of a Surface Made of COG

A series of Topas™ 8007 plates (5 cm×5 cm×5 mm) sold by Topas Advanced Polymers is cleaned with acetone and isopropanol and then dried with compressed air.

200 Microliters of a treatment solution $A_1$ according to the invention, comprising 0.01% by weight of polymer 1 in a phosphate buffer at pH=7.4, sold by Life Technologies under the name Phosphate-Buffered Saline (PBS, pH=7.4), are subsequently spread homogeneously over one of the faces of a plate and then the surface thus treated is left to incubate at ambient temperature for 1 hour.

In another experiment, 200 microliters of a treatment solution $B_1$ according to the invention, comprising 0.1% by weight of polymer 1 in ethanol, are spread homogeneously over one of the faces of a second plate and then the surface thus treated is left to incubate at ambient temperature for 1 hour.

In both cases, the plate is subsequently rinsed with osmosed water, in order to remove the nonadsorbed polymer, and then dried with compressed air.

The plates thus prepared are ready for their subsequent use.

Two new plates are also prepared according to the same protocol using treatment solutions $A_2$ and $B_2$, which are identical to the solutions $A_1$ and $B_1$ except that the polymer used is polymer 2.

Example 7: Measurement of Contact Angle

The contact angle of water on the plates treated with the solutions $A_1$, $B_1$, $A_2$ and $B_2$ was measured using an optical goniometer.

A drop of water of 3 microliters is deposited using a syringe and the image of the drop during its formation is analyzed in grazing incidence by a high resolution camera and then processed using software.

A COC surface originally from the same source but which has not been subjected to the treatment of the polymers of the invention is used as reference.

In all cases, a mean over 10 measurements is taken in order to determine the error bar. The results, recorded in the table below, reveal that all of the polymers and embodiments make it possible to significantly reduce the contact angle, that is to say to render markedly more wetting the initially hydrophobic surfaces.

| Treatment solution | Contact angle (degrees) |
|---|---|
| Untreated surface | 89.4 +/− 2.7 |
| Surface treated with the solution $A_1$ | 72.7 +/− 1.2 |
| Surface treated with the solution $A_2$ | 72.1 +/− 1.1 |
| Surface treated with the solution $B_1$ | 74.8 +/− 1.3 |
| Surface treated with the solution $B_2$ | 77.7 +/− 1.8 |

Example 8: Treatment of Microchannels

Preparation of the Microchannels

An aluminum mold comprising a cross is prepared by micromachining using a Minitec Machinery Corporation device and a cutting tool with a diameter of 100 µm.

The design of the microchannels is represented in FIG. 1. The lengths of each of the branches of cross v are as follows: branch i: 4 mm; branch ii: 4 mm; branch iii: 4 mm; branch iv: 50 mm.

A COC plate as presented in example 7 is brought into contact with the mold (master) within a heated hydraulic press (SPECAC™). The embossing is carried out under a pressure of 50 kPa at 130° C. for 10 minutes. It is followed by cooling to 40° C. under the same pressure and then the press is opened and the plate carrying the microchannels is withdrawn. The reservoirs are drilled using the drilling machine and the plate is washed in an ultrasonic isopropanol bath and then dried.

The microchannels are subsequently closed using a COC film. The plate carrying the microchannels and the film are placed for 4 minutes above a bath of cyclohexane in a petri dish provided with a lid, in order to be exposed to the cyclohexane vapor, and are then pressed against one another at 50 kPa at 60° C. for 20 minutes. The width of the channels is 100 µm and their depth is 50 µm. The reservoirs at the end of each branch of the cross have a diameter of 3 mm and a depth of 5 mm. Tygon™ tubes are connected on the one hand to the reservoirs of the chip and on the other hand to the reservoirs of an MFCS Fluigent™ pressure control system, in order to cause the fluids in the chip to move from the end of the longest branch of the cross.

The treatment of the microchannels with the aqueous solutions ($A_1$ or $A_2$) is carried out as follows:

the microchannels are first filled with 500 µl of ethanol filtered under pressure [($\Delta P=3.5\times10^4$ Pa (350 mbar*)];

the ethanol is subsequently removed by rinsing them with 500 µl of 1×PBS buffer at $2\times10^4$ Pa (200 mbar);

500 µl of the treatment solution are then injected at a pressure of $10^4$ Pa (100 bar) and left to incubate for 1 hour at the temperature of the room without flow;

finally, the channels are rinsed with 500 µl of PBS at a thrusting pressure of $10^4$ Pa (100 mbar).

The treatment of the microchannels with the alcoholic solutions ($B_1$ or $B_2$) is carried out as follows:

the alcoholic solution comprising the polymer is injected directly under the same conditions as those mentioned above;

the channel is dried under vacuum and then rinsed with an aqueous PBS solution.

Example 9: Measurement of Electroosmosis in the Microchannels Prepared in Example 8

The electroosmosis properties are measured by the technique of the measurement of the current, as described in Yasui T. et al "Characterization of low viscosity polymer solutions for microchip electrophoresis of non-denatured proteins on plastic chips", *Biomicrofluidics*, Vol. 5, Issue 4, page 044114.

the microchannels, the sample reservoir i, the buffer reservoir ii and the sample outlet reservoir iii are filled with a first phosphate buffer 20 mM, pH=7.5;

the buffer outlet reservoir iv is filled with the buffer diluted 5-fold, i.e. 4 mM, pH=7.5;

a voltage source HVS448 1500V Labsmith, Livermore, is used to apply a field of 270 V/cm and to cause a buffer front to migrate, by electroosmosis, from the buffer outlet reservoir, and the current is measured during the operation using the software supplied by Labsmith;

the time necessary to reach a plateau is used to measure the linear rate of electroosmosis. For this experiment, three independent measurements were carried out.

The results, recorded in the table below, show that, in all cases, the treatments according to the invention made it possible to reduce the electroosmosis, which is characteristic of a lasting presence of a layer of hydrophilic polymer at the surface of the microchannel.

| Treatment solution | Rate of electroosmosis ($\times 10^{-4}$ cm$^2$/V/s) |
| --- | --- |
| Untreated surface | 2.76 +/− 0.14 |
| Surface treated with the solution $A_1$ | 0.85 +/− 0.14 |
| Surface treated with the solution $A_2$ | 1.43 +/− 0.19 |
| Surface treated with the solution $B_1$ | 1.23 +/− 0.04 |
| Surface treated with the solution $B_2$ | 0.75 +/− 0.15 |

Example 10: Effects on the Adsorption of Proteins of the Treatment of a Microchannel Made of COC with the Solution $B_2$ Simple linear channels were prepared according to the same protocol as that described in example 8, except for the shape of the mold, which exhibits a simple straight channel with a length of 3 cm and a width of 500 µm.

After treatment of the surface of the microchannel with the solution $B_2$ according to the protocol described in example 8, the microchannel is filled by circulation of 500 µl 1×PBS. A solution of BSA (fluorescent bovin serum albumin, from Life Technologies™) in suspension at 0.1% by weight in 1×PBS is then introduced into the channel at a pressure of $10^3$ Pa (10 mbar) and is incubated for 10 minutes at ambient temperature. The channels are subsequently rinsed for 10 minutes with protein-free 1×PBS under a pressure of 10 mbar. The fluorescence of the microchannel before and after incubation is recorded using a Nikon Eclipse™ microscope equipped with a Coolpix Roper Scientific™ camera, an HGFIL™ 130 W lamp and a set of FITC™ filters, with a fixed exposure time of 200 ms. 3 Different measurements were carried out at different points for each condition and the signal was corrected for the background noise of the camera and for the self-fluorescence of the COC (recorded outside the microchannel). In order to evaluate the reversible nature of the treatment and to confirm that the surface has not been detrimentally affected, 3 cycles of fixing the protein, rinsing with PBS, drying with alcohol and then again treating were carried out, without giving rise to a significant variation in the results. The latter, recorded in the table below, reveal that the treatment according to the invention greatly reduces the adsorption of this protein, which is known to adhere strongly to surfaces, in particular hydrophobic surfaces.

| Treatment | Fluorescence (arbitrary units) | Number of beads adsorbed |
| --- | --- | --- |
| None | 14.3 +/− 1.6 | 3326 +/− 930 |
| Solution $B_2$ | 2.9 +/− 0.3 | 139 +/− 49 |

Example 11: Adsorption of Microparticles within a Microchannel

The same protocol as for example 10 was used, except for the solution of fluorescent protein, which was replaced with 70 µl of a solution of microbeads at a concentration of 0.13 bead/µl ("Dynabeads Epithelial Enrich") in PBS enriched with 0.1% of Tween 20™ in order to ensure the colloidal stability of the beads.

This solution was first introduced at 100 mbar and then the pressure was reduced in order to achieve a flow rate of 1 µl/min in order to promote the sedimentation of the beads. Finally, the nonadsorbed beads were removed by rinsing with a solution of PBS enriched with 0.1% of Tween 20™ at a pressure of 300 mbar.

Images of an untreated microchannel and of a microchannel pretreated with the solution $B_2$ were taken using the same microscope as described in example 10, provided with a 10× objective, and were processed automatically in order to count the beads. The results, given in the third column of table 10.1, show that the treatment spectacularly reduces the adsorption of microparticles.

Example 12: Determination of the CMC of the Polymers 1 and 2

The CMC is determined by the Wilhelmy plate method (K10 device, Kruss), with a series of dilutions of the polymers in a 1×PBS buffer, varying from $10^{-8}$% to 1%. For the two polymers, the CMC determined by this method is between 0.5% and $2\times10^{-3}$% by weight of polymer.

Example 13: Use of Polymers According to the Invention of the Charged Polymer Type for Facilitating the Adhesion of Cells This study was carried out on open surfaces made of COC, consisting of Topas 8007 COG sheets, with a thickness of 145 μm. They were cut out according to the dimensions 2 mm×4 mm and were adhesively bonded to StarFrost glass slides with an adhesive which can be cured by UV irradiation (NOA81, Norland Optical Adhesive), in order to facilitate the handling thereof under a microscope. The insolation time used is 10 min with a UV lamp (Fisher Scientific).

Choice of the Treatments:

Use is made, as reference of the state of the art, of a treatment in the form of a double layer of hydroxyethyl cellulose (HEC, average molecular weight ~90 000, Sigma Aldrich)-poly-L-lysine (PLL, molecular weight: 150 000-300 000, concentration: 0.01%, sterile-filtered, Sigma Aldrich). The HEC treatment is biocompatible and it is adsorbed on the COG to render it hydrophilic (contact angle of the treated COC=56°). The PLL is adsorbed on the COC treated with HEC, conferring on it a positive charge, which improves the adhesion of the cells to the glass.

In this example, two charged polymers according to the invention were used:

another batch of DMAM-022 M polymer was grafted with 10% of anionic charges (sodium sulfonate) and a third batch of polymer was grafted with 10% of cationic charges (tertiary amine hydrochloride type). Thus, the anionic polymer can be used to couple the PLL to the surface of the COC and the cationic polymer could be used alone.

Preparation of the Slides:

The following solutions were prepared in order to treat the surface of the COO:

Solution 1: 2% by weight HEC in 1×PBS
Solution 2: neutral DMAM-C22 M (polymer 3 described in example 3) at 0.1% by weight in Milli-Q water
Solution 3: anionic DMAM-C22 (polymer 4 described in example 4) at 0.1% by weight in Milli-Q water
Solution 4: cationic DMAM-C22 (polymer 5 described in example 5), 0.1% by weight in Milli-Q water.

The polymer solutions were incubated over the COC overnight, then rinsed once with 50 μl of 1×PBS and then in a bath of 1×PBS for 5 minutes.

The COC slides treated with solutions 1, 2 and 3 were subsequently treated with a solution of PLL at 37° C. in an incubator with a humid atmosphere with 5% $CO_2$ for 2 hours and then rinsed with 1×PBS.

The COC slides treated with solution 4 were used directly without PLL.

For each slide, a silicone microchamber was adhesively bonded in order to confine the cells in a volume of 50 μl and to limit the surface area for adhesion of the cells in order to facilitate the imaging.

10 μl of a solution of epithelial cells (MCF-7 line, breast cancer) with a concentration of 2000 cells/μl were injected into each chamber.

After culturing for 24 hours in an incubator with a humid atmosphere with 5% of $CO_2$, the slides were washed twice with 1×PBS in order to remove the cells which have not adhered to the substrate. The cells which have adhered to the COC were subsequently fixed for 30 min in a 3.7% paraformaldehyde solution. After fixing, the slides were washed twice in 1×PBS.

EpCAM-FITC Labelings+DAPI/Vectashield:

In order to compare the effectiveness of the treatments, the cells attached to the slides after having labeled them with fluorescence were observed by fluorescence microscopy. The cell membranes were labeled with anti-EpCAM antibodies (20 μl EpCAM Ab+500 μl PBS+1% BSA) at ambient temperature for 30 min. A first washing was subsequently carried out with 50 μl of a 1×PBS solution comprising 1% of BSA and then in a bath of 1×PBS at ambient temperature for 5 minutes. Finally, a drop of DAPI/Vectashield was applied to each spot of cells and everything was covered with a cover slip having dimensions of 50×24 mm. The samples were retained at 4° C. until the acquisition of the fluorescence images (DAPI+FITC).

Results:

The HEC+PLL solution improves the adhesion of the cells to the surface of the COC. On the other hand, this treatment does not appear suitable for the culturing of MCF-7 cells. In our experiments, we observed a low density of cells adhered to the COC. Many cells appear to have burst or to have undergone an apoptotic process, the membranes visible by EpCAM labeling are not well defined or are not observable, as is apparent in FIG. 2a.

For COC+DMAM-C22 M (0.35%)+PLL, a high background noise in the FITC channel, a suitable density of cells but many lysed or apoptotic cells are observed. This treatment appears to be a good candidate for attaching cells to the COC but not for their culturing.

For COC+anionic DMAM-C22+PLL, the background noise is low, which shows that this treatment does not promote the nonspecific adsorption of antibodies. However, the density of cells attached to the surface of the COC is low, which implies that the cells have trouble adhering to the substrate. Semiapoptotic cells but no lysed cells are also observed.

The cationic DMAM-C22 treatment (without PLL) appears suitable for promoting the adhesion and the division of the MCF-7 cells. A suitable cell density and doublets or multiplets of cells, which are characteristics of divided cells, are observed in FIG. 2b.

It is thus found that the charged polymers according to the invention can constitute an improvement with respect to the state of the art, either in the anionic form combined with a cationic polymer, for improving the cell adhesion, or used alone, for promoting cell culturing.

The invention claimed is:

1. A process for the treatment of a surface composed, in all or in part, of a hydrophobic material, the process comprising:

molding or etching, so as to create, on said surface composed, in all or in part, of a hydrophobic material, channels exhibiting, in one direction, at least one dimension of less than 1 mm;

bringing into contact with said surface on which said channels have been molded or etched an aqueous, aqueous/organic or organic solution of a linear, branched or crosslinked polymer comprising, per 100 mol %:

a) a molar proportion of greater than or equal to 75% and less than or equal to 99.95% of monomer units resulting from an N,N-dialkylacrylamide, the alkyl radicals each comprising from 1 to 4 carbon atoms, b) a molar proportion of greater than or equal to 0.05% and less than or equal to 1% of monomer units resulting from a monomer of formula (I):

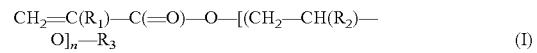

(I)

wherein n represents a number between 1 and 50, $R_1$ represents a hydrogen atom or a methyl radical, $R_2$ represents a hydrogen atom, a methyl radical or an ethyl radical and $R_3$ represents a saturated or unsaturated and linear or branched aliphatic hydrocarbon radical comprising from 8 to 30 carbon atoms, and c) optionally a molar proportion of greater than 0% and less than or equal to 24% either of monomer units resulting from a monomer comprising a free, partially salified or completely salified strong acid functional group or of monomer units resulting from a monomer of formula (II):

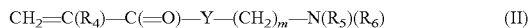

CH$_2$=C(R$_4$)—C(=O)—Y—(CH$_2$)$_m$—N(R$_5$)(R$_6$)    (II)

wherein m represents a number between 1 and 4, Y represents O or NH, R$_4$ represents a hydrogen atom or a methyl radical and R$_5$ and R$_6$, which are identical or different, represent a methyl radical or an ethyl radical, and d) optionally a molar proportion of greater than 0% and less than or equal to 1% of a diethylenic or polyethylenic crosslinking monomer, and allowing the solution of polymer and said surface to incubate;

rinsing said surface, after allowing the solution of polymer and said surface to incubate, in order to remove said polymer not adsorbed on the surface from said surface; and optionally, drying said rinsed surface resulting from stage b).

2. The process as defined in claim 1, wherein said surface is a surface of a chip, of a microfluidic system, of a microsystem or of a lab-on-a-chip.

* * * * *